(12) United States Patent
Voris

(10) Patent No.: US 10,994,395 B1
(45) Date of Patent: May 4, 2021

(54) LOOP-TYPE BAND CLAMP INSTALLATION TOOL

(71) Applicant: Brent Voris, Cocoa, FL (US)

(72) Inventor: Brent Voris, Cocoa, FL (US)

( * ) Notice: Subject to any disclaimer, the term of this patent is extended or adjusted under 35 U.S.C. 154(b) by 178 days.

(21) Appl. No.: 16/214,808

(22) Filed: Dec. 10, 2018

Related U.S. Application Data

(60) Provisional application No. 62/596,901, filed on Dec. 10, 2017.

(51) Int. Cl.
*B25B 25/00* (2006.01)
*F16L 33/02* (2006.01)

(52) U.S. Cl.
CPC ............ *B25B 25/005* (2013.01); *F16L 33/02* (2013.01)

(58) Field of Classification Search
CPC ... B25B 25/00; B25B 25/005; F16L 33/02–34
See application file for complete search history.

(56) References Cited

U.S. PATENT DOCUMENTS

| | | | | |
|---|---|---|---|---|
| 2,910,899 A * | 11/1959 | Barnes | ................... | B25B 25/005 81/9.3 |
| 6,164,162 A * | 12/2000 | Furundzic | ............. | B25B 25/005 29/229 |
| 6,370,985 B1 * | 4/2002 | Wu | ........................ | B25B 25/005 29/229 |
| 7,966,911 B2 * | 6/2011 | Thayer | .................. | B25B 25/005 81/9.3 |
| 10,443,770 B2 * | 10/2019 | Yang | ...................... | B25B 27/205 |
| 2003/0033909 A1 * | 2/2003 | Gore | ................... | B25B 23/0085 81/9.3 |

* cited by examiner

*Primary Examiner* — Tyrone V Hall, Jr.
(74) *Attorney, Agent, or Firm* — Wolter Van Dyke Davis, PLLC; John L. DeAngelis

(57) ABSTRACT

Tool for securing a loop-type band clamp around an object. Turning a drive screw displaces an upper jaw relative to a lower jaw of the tool. An alignment component is inserted through holes in band clamp tabs and then a fastener engages a receiving end of the alignment component. An opening in the lower jaw receives the fastener and an opening in the upper jaw receives an upper segment the alignment component. The upper and lower jaws compress the tabs by operation of the drive screw, closing the loop around the object. While the tabs are compressed, the alignment component is separated from the fastener and a clamp fastener is inserted through the tab holes and mated with the fastener. The upper segment of the alignment component is removed from the upper jaw. The upper and lower jaws are removed from the band clamp by operation of the drive screw.

20 Claims, 10 Drawing Sheets

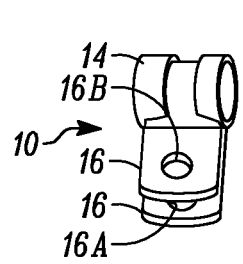
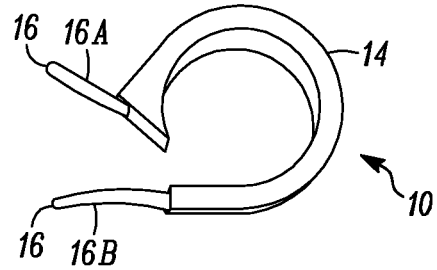
FIG. 1A
(PRIOR ART)
FIG. 1B
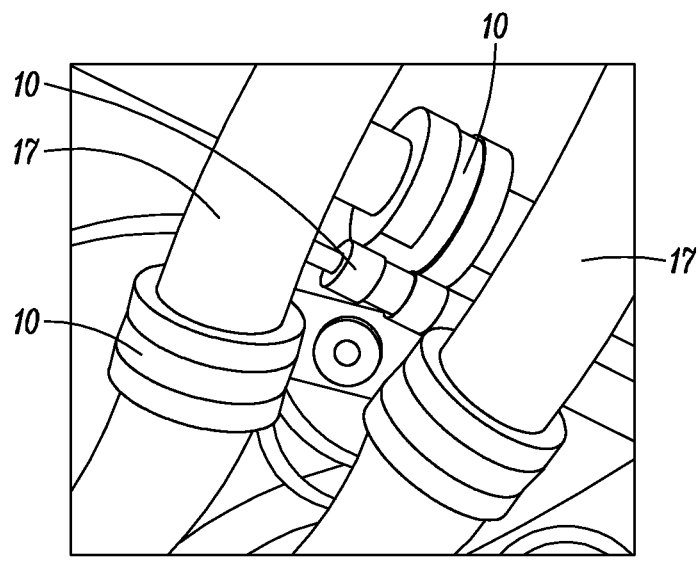
FIG. 2
(PRIOR ART)
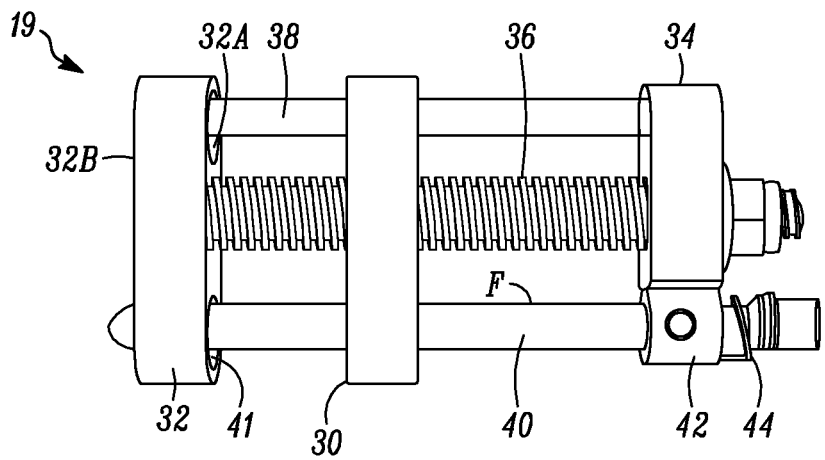
FIG. 3

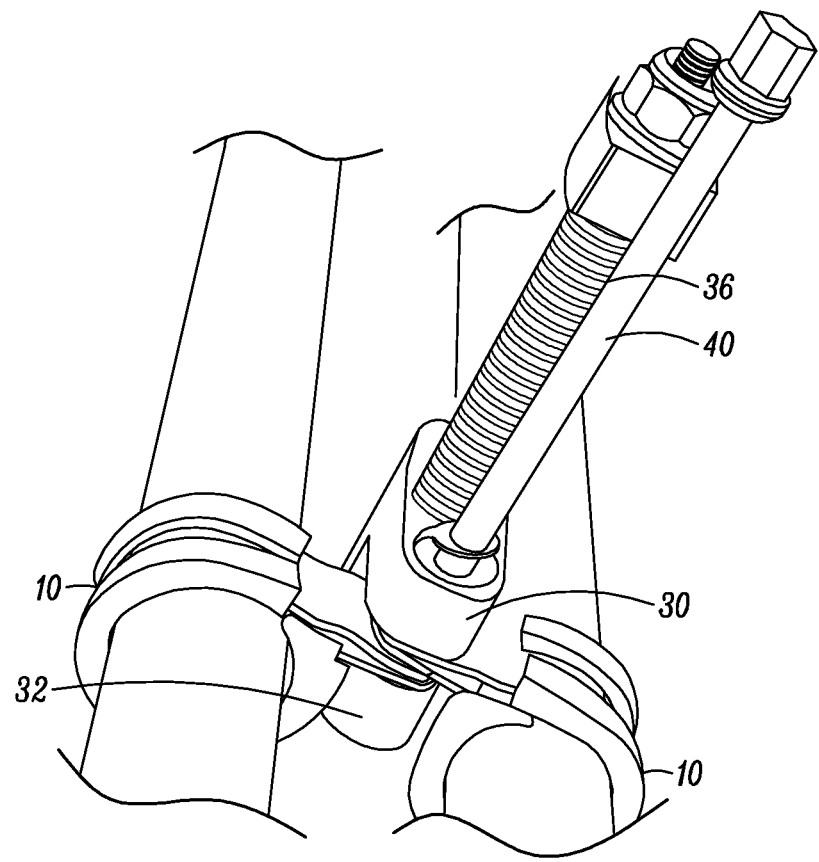
FIG. 17
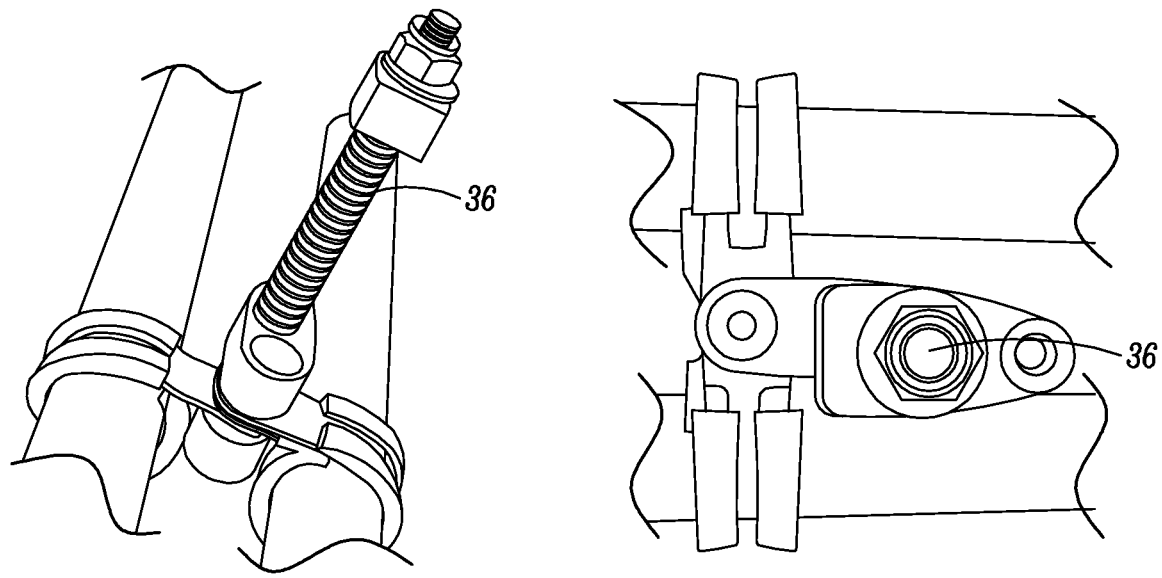
FIG. 18
FIG. 19

LOOP-TYPE BAND CLAMP INSTALLATION TOOL

CROSS REFERENCE TO RELATED APPLICATIONS

This application claims the benefit of the provisional patent application filed on Dec. 10, 2017 and assigned Application No. 62/596,901, which is incorporated herein.

FIELD OF THE INVENTION

The present invention relates to the general field of loop-type band clamps and in particular to a tool for installing loop-type band clamps.

BACKGROUND OF THE INVENTION

Loop-type band clamps are used in aviation, marine, automotive, and a wide variety of industrial applications to support tubing, wire bundles, conduit, ducting, control cables, and similar components that require routing and securing along a path from origin to endpoint.

These clamps are typically installed using a bolt and mating nut, with or without washers. A conventional band clamp comprises a flexible metal or plastic band shaped to form a loop. Each end of the loop terminates in a tab such that by placing the tabs in a contact relation and securing the tabs together securely captures components passing through the loop.

Prior art FIGS. 1A and 1B illustrate two views of a loop-type band clamp 10 (also referred to as a band clamp) each comprising a metal band or loop 14 and tabs 16. In the illustrated embodiment a portion of the band loop is covered by an insulating cushion material, such as rubber. Components extending through the loop (a wire bundle, for example) are secured as the band exerts a radially-inward directed force against the components when the tabs are fastened together. A bolt extending through tab openings 16A and 16B and captured with a mating nut (neither illustrated) secure the tabs together.

A typical installation involves two or more clamps with tubing, wire bundles, etc. (reference numeral 17) passing through the loop of each clamp. The tabs of the two clamps are fastened together and the two clamps further secured together with a single bolt and mating nut that passes through each of the clamps' tab openings (also referred to as bolt holes or fastening holes). See FIG. 2. The clamps, when tied together as illustrated, provide a neater and traceable installation and can better withstand the effects of any structural vibrations. In some installations in addition to securing the two clamps together, they are also attached to a structural member for additional support and for dampening vibrations.

FIG. 2 illustrates four loop-type clamps (each supporting a fluid-carrying tube) secured together. Tying several clamps together as in FIG. 2 is a frustrating and time-consuming operation. A force must be applied to each clamp against the spring bias of each clamp band, the fastening holes must be aligned, and finally the clamps must be secured together.

BRIEF DESCRIPTION OF THE DRAWINGS

The forgoing and other features of the present invention will be apparent to one skilled in the art to which the present invention relates upon consideration of the description of the invention with reference to the accompanying drawings, herein:

FIGS. 1A and 1B illustrate different views of a prior art loop type band clamp.

FIG. 2 illustrates a typical prior art installation of four loop-type band clamps.

FIG. 3 illustrates a loop-type band clamp installation tool of the present invention.

FIGS. 16 and 17 illustrate different views of the installation tool of the present invention during installation of two loop-type band clamps.

FIG. 18 illustrates the installation tool of the present invention after the alignment pin has been removed.

FIG. 19 illustrates a bottom view of the installation tool of the present invention after the alignment pin has been removed.

DETAILED DESCRIPTION OF THE INVENTION

Figure 4:
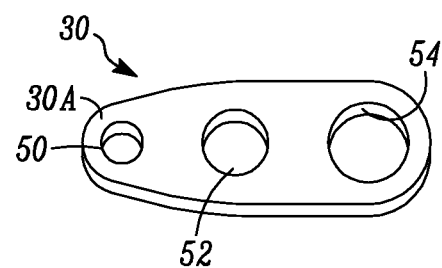
FIG. 4 illustrates an upper jaw of the installation tool of the present invention.

Before describing in detail the particular methods and apparatuses related to the loop-type band clamp installation tool of the present invention, it should be observed that the embodiments of the present invention reside primarily in a novel and non-obvious combination of elements and method steps. So as not to obscure the disclosure with details that will be readily apparent to those skilled in the art, certain conventional elements and steps have been presented with lesser detail, while the drawings and the specification describe in greater detail other elements and steps pertinent to understanding the embodiments.

The presented embodiments are not intended to define limits as to the structures, elements or methods of the inventions, but only to provide exemplary constructions. The embodiments are permissive rather than mandatory and illustrative rather than exhaustive.

The loop-type band clamp installation tool 19 (see FIG. 3) of the present invention is a hand tool designed to provide simplified techniques and components for a technician to secure one or more loop-type band clamps (that capture and support one or more objects, such as wire bundles, cables, tubing, etc.) in a desired position and orientation during installation of hardware components (a bolt and mating nut, for example) that securely hold the objects. The tool can also be used to install and removably connect two or more loop type band clamps, each band clamp supporting a different object(s).

One embodiment of the tool, shown in FIG. 3, comprises eight principal parts: an upper jaw 30, a lower jaw 32, an upper retainer 34, a drive screw 36, a guide pin 38, an alignment pin 40, a bushing 42, and a hold washer 44. Note that the alignment pin and associated bushing and hold washer are not captured or mated with the upper retainer, although FIG. 3 may appear to suggest otherwise.

Components of the Loop-Type Band Clamp Installation Tool

The upper jaw 30 illustrated in FIG. 4 can be formed from a metal bar of generally rectangular cross section. In one embodiment the upper jaw is 0.375 inches thick. Three holes are defined in the upper jaw: a hole 50 receives the guide pin 38, as described further below, and is located at a narrow end of the upper jaw; a threaded hole 52 in a center region of the upper jaw receives the drive screw 36; and a hole 54, disposed at a widest end of the upper jaw, receives the alignment pin 40.

Figure 22:
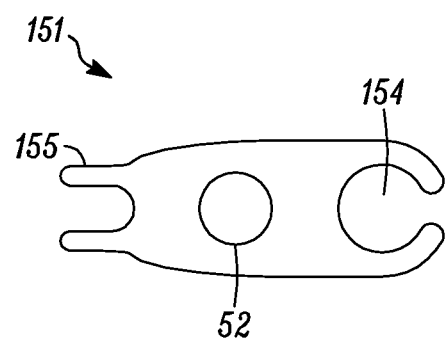
FIG. 22 illustrates an alternative embodiment for the upper jaw of the installation tool.

As can be seen in FIG. 4, the hole 54 is bounded by a closed circumference. In another embodiment, an upper jaw 151, as illustrated in FIG. 22, comprises a slotted hole 154 that replaces the hole 54. In this embodiment the alignment pin 40 is inserted through the slot, thereby simplifying the step of mating and demating the upper jaw 30 and the alignment pin 40, as further described below. In this embodiment the hole 50 is replaced by a slot 155 as shown in FIG. 22.

The dimensions of the upper jaw 30 and the lower jaw 32 are selected to allow the tool to be positioned over the bolt holes of multiple loop type clamps without interfering with the functionality of the clamp's loops and the wires/tubes/etc. held within the clamp loops.

Returning to FIG. 3, the guide pin 38 passes freely through the guide pin hole 50 of the upper jaw 30 and is secured in a counterpart guide pin hole 60 (see FIG. 5) in the lower jaw 32 to maintain alignment between the upper jaw and the lower jaw while the tool is installed around the loop-type band clamps.

Depending on a cross-sectional shape of the guide pin 38, the guide pin hole 50 in the upper jaw 30 and the guide pin hole 60 in the lower jaw 32 may be circular, square, hexagonal, slotted, or another shape for receiving the guide pin.

During installation of the loop-type band clamps, the alignment pin 40 is first inserted through bolt holes 16A and 16B of the loop-type band clamps 10 to maintain the bolt holes in an aligned configuration. To maintain this condition, a threaded end 40B (of the alignment pin) extending from the bolt holes is mated with an alignment pin nut 41. See FIG. 9. More generally, in another embodiment the alignment pin is replaced by an alignment component (for example, a bolt) that ensures and maintains alignment of the bolt holes in the of the loop-type band clamps.

The alignment pin 40 is then mated with the upper and lower jaws of the tool. The alignment pin is received within the hole 54 of the upper jaw 30 (see FIG. 4)(or the slotted opening 154 of FIG. 22) and the alignment pin nut 41 is captured within a stepped hole 64 in the lower jaw 32 (see FIG. 5).

While the upper and lower jaws are compressed (by operation of the drive screw 36) the alignment pin 40 maintains alignment of the bolt holes of the band clamps.

After compressing the loop-type band clamps as shown in FIG. 17, the threaded end 40B of the alignment pin 40 is threadably disengaged from the alignment pin nut 41, and the alignment pin is slipped out from the upper and lower jaws 30 and 32. The alignment pin nut remains within the stepped hole 64 of the lower jaw. The compressive force exerted by the upper and lower jaws maintains the band clamp bolt holes 16A and 16B (see FIGS. 1A and 1B) in alignment.

A clamp bolt 100 is then inserted in the hole 54 of the upper jaw (see FIG. 4). A diameter of the hole 54 is slightly larger than a diameter of a head of the clamp bolt 100, allowing the clamp bolt 100 to turn freely within the hole 54. Since the alignment pin nut 41 had been retained within the hole 64 of the lower jaw 32 (see FIG. 5), the clamp bolt 100 is threadably engaged with the alignment pin nut. The clamp bolt 100 and mating nut securely hold the loop-type band clamps around the object 17. See any of FIGS. 18-21.

Figure 7:
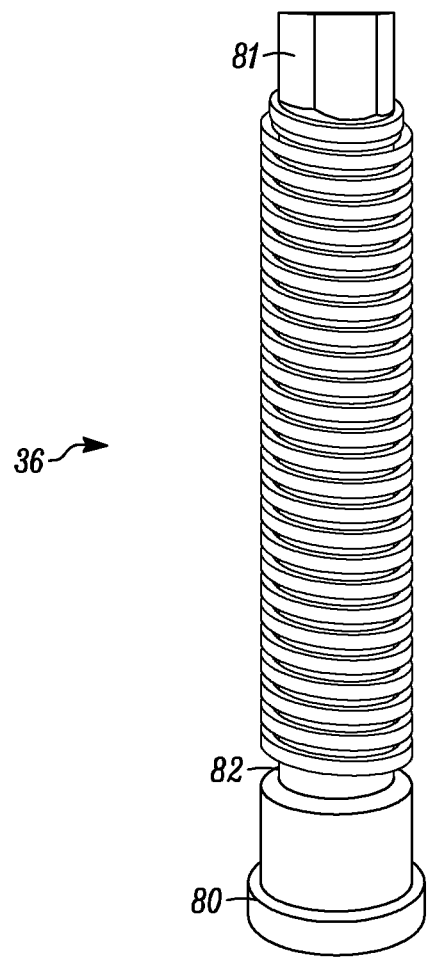
FIG. 7 illustrates a drive screw of the installation tool of the present invention.

Operation of the drive screw 36 displaces the upper jaw relative to the lower jaw to apply the compressive force. The drive screw 36 threadably engages threads of the threaded hole 52 in the upper jaw 30. The drive screw 36 also turns freely in a stepped counterpart non-threaded hole 62 (see FIG. 5) in the lower jaw 32, as described further below. The hole 62 is stepped (from the lower surface of the lower jaw) to receive a button end 80 (see FIG. 7) of the drive screw, thereby resulting in a shorter embodiment of the tool. In an embodiment in which the hole is not stepped, the drive screw button simply rests against a lower surface of the lower jaw, increasing the length of the tool.

Thus, rotation of the drive screw 36 displaces the upper jaw 30 relative to the lower jaw 32, thereby applying a clamping force between the upper jaw and lower jaw. This force closes all the loop-type band clamps captured therebetween without damaging any of the wires/tubes/etc. captured by the loop-type band clamps.

The upper jaw 30 may be dimensioned and shaped at the end 30A proximate the guide pin hole 50 (see FIG. 4) to allow it to be held with a wrench for providing countertorque when turning the drive screw 36 to apply the compressive force.

The upper and lower jaws 30 and 32 are removed after the clamp bolt 100 has been threadably engaged with the alignment pin nut 41.

Figure 5:
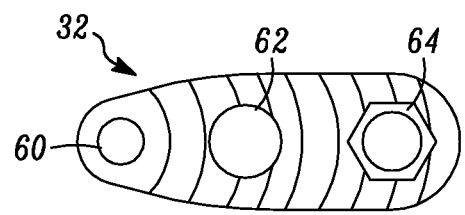
FIG. 5 illustrates a lower jaw of the installation tool of the present invention.

This installation technique and the associated unique features of the components of the tool of the present invention are further described below in the section entitled, Operation of the Loop-Type Band Clamp Installation Tool FIG. 5 illustrates the lower jaw 32 as viewed from the upper jaw 30, i.e., the top view. The lower jaw is also formed from a bar of material having a generally rectangular cross section. The three holes 60, 62, and 64 are formed therein: the hole 60 receives the guide pin 38 and is located at a narrow end of the lower jaw; a hole 62 comprises two concentric openings of different diameters, a first through-hole circular opening for receiving a shank of the drive screw 36 and a second larger concentric circular opening for receiving a button or head 80 (see FIG. 7) of the drive screw, which has a larger diameter than the shaft (note that the larger opening is not visible in FIG. 5 as that opening is on the underside or hidden side in FIG. 5); the stepped hole 64 for receiving the alignment pin 40 and the alignment pin nut 41. The depth and shape of the stepped hole 64 are dependent on the size and shape of the alignment nut.

The guide pin 38 is secured in the hole 60 of the lower jaw 32 to maintain spacing and alignment between the upper jaw 30 and lower jaw 32, to stabilize the tool, and to provide counter torque when turning the drive screw 38 during clamp installation.

The drive screw 36 is received within the hole 62 of the lower jaw 32 and may be held within that hole by collars, retainers, spring clips, or other elements that interface with the button 80 at the lower end of the drive screw. The collars, retainers, etc. mate with a grove 82 (see FIG. 7) proximate the button 80. The collars, retainers, etc. are not illustrated in FIG. 7). Thus, the drive screw is retained in the lower jaw by oppositely directed forces exerted by the button exerting a force on the lower surface of the lower jaw and the collar, retainer, etc. exerting a force against an upper surface of the lower jaw. The drive screw can therefore turn freely within the hole 62 of the lower jaw. But since the drive screw is threadably engaged with the hole 52 of the upper jaw 30, rotation of the drive screw moves the upper and lower jaw relative to each other.

The hole 64 of the lower jaw comprises a hexagonal portion of about 0.25" deep (or shallower in another embodiment) in a surface of the lower jaw that faces the upper jaw, (that surface is identified by reference numeral 32A in FIG. 3). This hexagonal portion receives the alignment pin nut 41 and prevents rotation of the nut when the alignment pin is threadably disengaged from the alignment pin 40. The hole 64 further comprises a concentric smaller through-hole portion for receiving the alignment pin 40. The hole 64 is referred to as a stepped hole.

After bolt holes in the loop-type band clamps have been aligned and the upper and lower jaws have compressed the tabs 16 of the loop-type band clamps, the alignment pin is threadably disengaged from the alignment nut 41 in the hole 64 of the lower jaw, withdrawn through the hole 54 in the upper jaw, the clamp bolt 100 is inserted into the hole 54 (a diameter of the hole 54 greater than a diameter of a bolt head), and the bolt is threadably engaged with the alignment pin nut 41.

The drive screw is then turned to release the upper and lower jaws from the loop-type band clamps.

The lower jaw 32 can be dimensioned and shaped proximate the guide pin hole 64 to be held with a wrench to provide counter torque when turning the drive screw to compress the loop-type band clamps.

Figure 6:
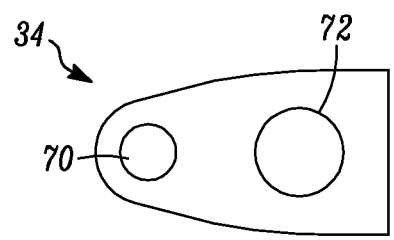
FIG. 6 illustrates an upper retainer of the installation tool of the present invention.

The upper retainer 34, see FIG. 6, is formed from a bar of generally rectangular cross section with two holes formed therein. The guide pin 38 is secured in a first hole 70 disposed at a narrow end of the upper retainer to maintain spacing and alignment between the upper retainer, the upper jaw 30, and the lower jaw 32, to stabilize the tool, and to provide counter torque when turning the drive screw 36 during clamp installation.

The drive screw 36 turns freely in a second hole 72 of the upper retainer 34 and is secured in place by collars, retainers, spring clips, or other elements that allow the drive screw to turn freely in the upper retainer 34.

The upper retainer 34 may be dimensioned on a side proximate the hole 70 so that the upper retainer can be held with a wrench to provide counter torque when turning the drive screw 36.

The drive screw 36 (see FIG. 7) comprises a threaded rod that passes through the upper retainer 34, the upper jaw 30, and the lower jaw 32. The drive screw is freely rotatable relative to the lower jaw and the upper retainer (i.e., the drive screw is not threadably engaged in the hole 62 in the lower jaw or in the hole 72 in the upper retainer). But the drive screw is threadably captured in the hole 52 of the upper jaw 30.

To maintain these rotational features, the drive screw 36 may be mated to the upper retainer 34 and the lower jaw 32 by collars, retainers, spring clips or other elements. The drive screw maintains spacing and alignment between these three tool components, and as the drive screw is rotated, also moves the upper jaw toward (or away when rotated in the opposite direction) from the lower jaw 32, thereby exerting the necessary clamping forces to close the loop-type band clamps.

A lower segment of the drive screw 36 has a button, collar, spring clip(s), retainer, bearing, bushing, or other element (for example, a button 80 (see FIG. 7) that mates with a stepped feature of the hole 62 in the lower jaw). Mating the button with the stepped feature of the hole 62 provides extra rigidity to the tool while in use and reduces a length of the tool. This latter feature may be important when the tool is used in confined spaces. In another embodiment, the hole is not stepped and instead the button rests against a lower surface 32B (see FIG. 3) of the lower jaw. In any case, as the drive screw 36 is rotated, it turns freely in the hole 62 of the lower jaw.

An upper end 81 of the drive screw 36 (see FIG. 7) incorporates a feature for turning the drive screw; that feature may comprise a socket, hex, square, slot, Phillips head, or a similar feature for turning the drive screw with a hand tool to move the upper jaw 30 relative to the lower jaw 32.

Figure 8:
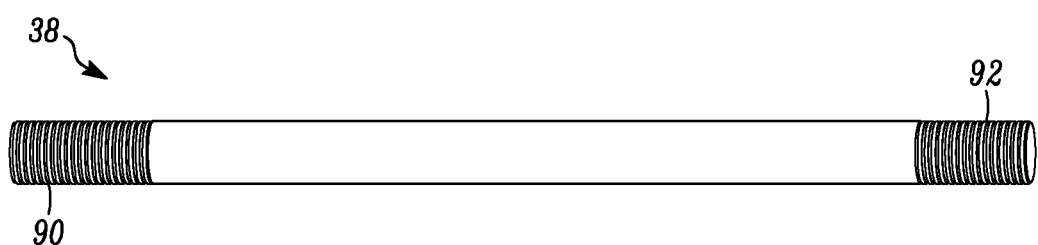
FIG. 8 illustrates a guide pin of the installation tool of the present invention.

The guide pin 38 (see FIG. 8) is threadably secured in the upper retainer 34 and the lower jaw 32 to properly space and align the upper retainer, the upper jaw, and the lower jaw. See threaded segments 90 and 92 in FIG. 8. The guide pin passes freely through the hole 50 in the upper jaw (see FIG. 4), or in another embodiment (not illustrated) may pass through a slot, or alongside a tang on the upper jaw 30.

The guide pin 38 stabilizes the tool and provides counter torque when turning the drive screw 36 during clamp installation.

The guide pin can be of any cross-sectional shape and may have a socket or hex, square, slot, Phillips, or similar head on either end for use with a tool for applying a counter torque when tightening the drive screw 36.

The alignment pin 40 (see FIG. 9) comprises an elongated member of any cross section with an oppositely disposed drive head end 40A and a threaded end 40B. The threaded end may have a tapered, rounded, or flat tip and receives the alignment nut 41 or another suitable fastener (see FIGS. 3 and 9).

The drive head end may comprise a socket or hex, square, slot, Phillips, or similar drive feature for separating the alignment pin from the nut or fastener 41. When installed in the tool 19, the alignment pin 40 pass through the opening 54 in the upper jaw (see FIG. 4) and the hole 64 in the lower jaw (see FIG. 5). The alignment pin is disposed aside the upper retainer 34, but does not pass through an opening in the upper retainer. See FIG. 3. After the loop-type band clamps have been captured between the upper and lower jaws, the alignment pin is separated from the nut 41, thereby allowing the alignment pin to be withdrawn from the holes in the upper and lower jaws.

The alignment pin 40 captures the loop-type band clamps by passing through the bolt hole in each loop-type clamp and holding the clamps in alignment while the installation tool 19 compresses the band clamps by action of the upper and lower jaws.

In another embodiment the alignment pin 40 is replaced with an appropriately sized bolt that performs the same function, or with a plain rod of any cross section that serves to align the loop-type band clamps while the tool is tightened about the loop type band clamps.

The bushing 42 is slidably engaged with the alignment pin 40. The bushing comprises a generally tubular component of any suitable cross-sectional shape with an axial opening for receiving the alignment pin. An inner diameter of the axial opening is sized to allow the alignment pin 40 to pass freely therethrough; an outer diameter is sized to fit snugly in the hole 54 of the upper jaw. See FIG. 4. Thus, the alignment pin 40 aligns and maintains that alignment for the hole 54 in the upper jaw, the hole 64 in the lower jaw, and the bolt hole in each of the loop-type band clamps.

The hold washer 44 (see FIG. 11) has an inner diameter slightly larger than an outside diameter of the alignment pin 40 (for receiving the alignment pin therein) and an outside diameter slightly smaller than the outside diameter of the bushing 42. A tang 44A extends from one surface of the washer 44 and is disposed at an angle relative to the washer body. The tang 44A contacts the bushing 42 before the bushing makes contact with the flat surface of the hold washer. This action orients the washer at an acute angle relative to the alignment pin, thereby creating a frictional force that secures the bushing in place when the bushing experiences spring forces exerted by the loop-type band clamps.

Operation of the Loop-Type Band Clamp Installation Tool

Figures 11, 12:
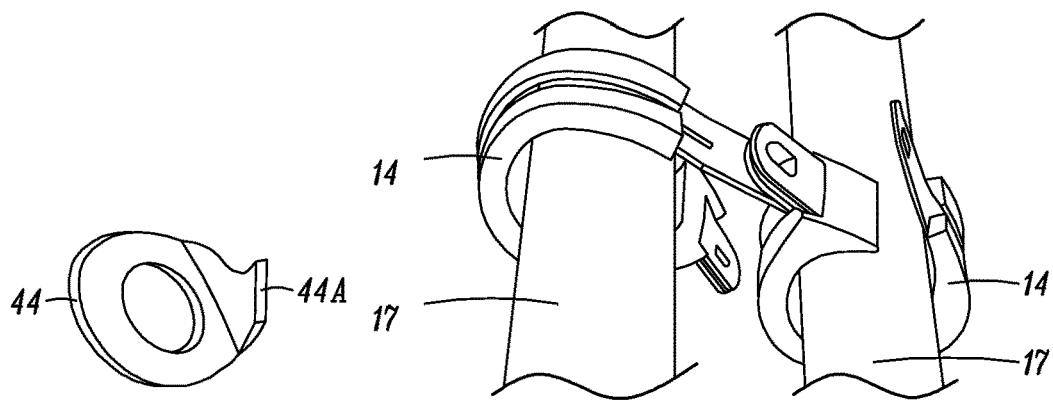
FIG. 11 illustrates a hold washer of the installation tool of the present invention.
FIG. 12 illustrates two loop-type band clamps prior to installation.

The loop type band clamps 10 are installed over the wire bundle(s), fluid line(s), control cable(s), tube(s), duct(s), etc. near their final positions. See FIG. 12 illustrating two loop-type band clamps 10.

The hold washer 44 is installed on the alignment pin 40 with the tang 44A directed away from a drive head 40A of the alignment pin 40. See FIG. 9.

Figure 13:
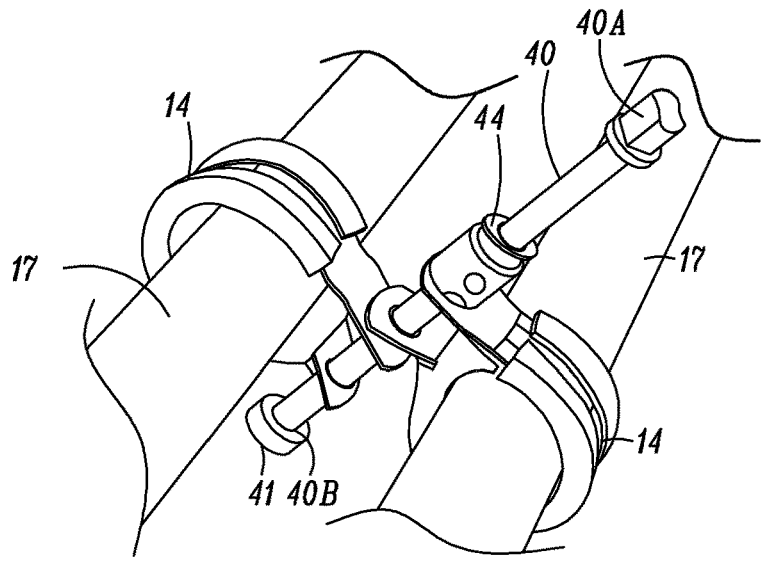
FIGS. 13, 14, and 15 illustrate different views of the alignment pin of the installation tool of the present invention, as installed on two loop-type band clamps.
Figure 14:
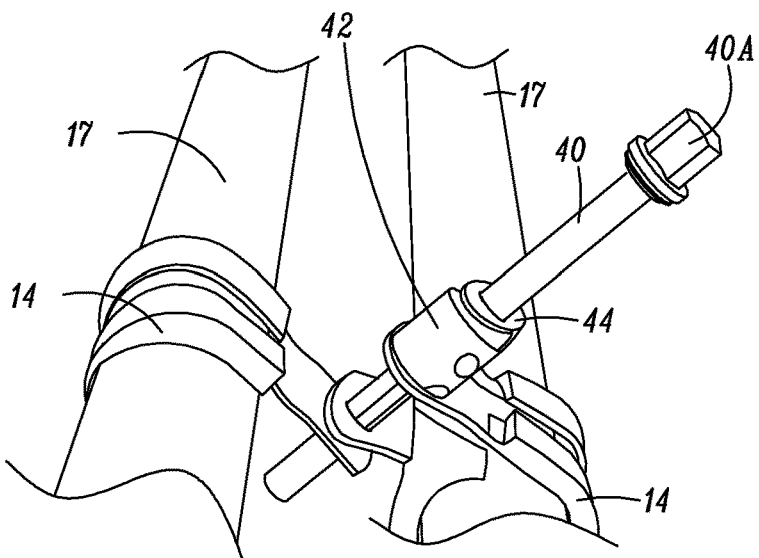

The bushing 42 is then installed on the alignment pin 40. Finally, this assembly is passed through each loop-type clamp bolt hole to align the clamp bolt holes. FIGS. 13 and 14 illustrate the final configuration. Note that the threaded end 40B of the alignment pin extends from the bolt holes of the lowest or last loop-type band clamp.

The alignment pin nut 41 is loosely threaded on the threaded end 40B (see FIG. 13) of the alignment pin 40, capturing the loop-type clamps 10 between the nut and the drive head of the alignment pin as illustrated.

Figure 15:
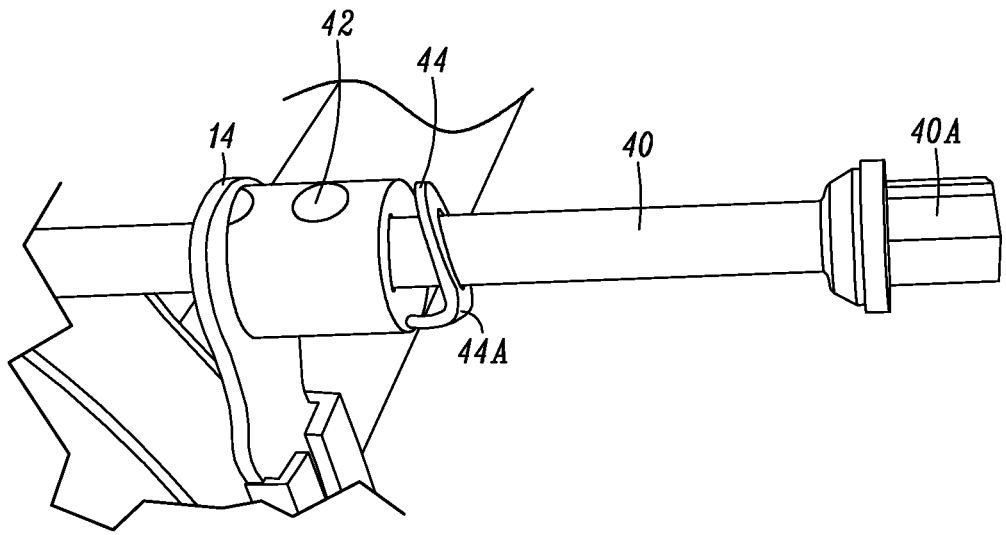

The hold washer 44 and the bushing 42 are manually moved down the shaft of the alignment pin 40 toward the threaded end 40B, thereby slightly compressing the loop-type band clamps between the bushing and the nut on the threaded end of the alignment pin. See also FIG. 15. A spring force, exerted in an opposing direction from the compressive force of the band clamps, urges the bushing against the hold washer 44. The tang 44A on the hold washer contacts the bushing 42, forcing the hold washer 44 into a non-perpendicular orientation with the alignment pin 40 and thereby creating a frictional force that secures the bushing 42 in place against the spring forces exerted by the band clamps.

Figure 16:
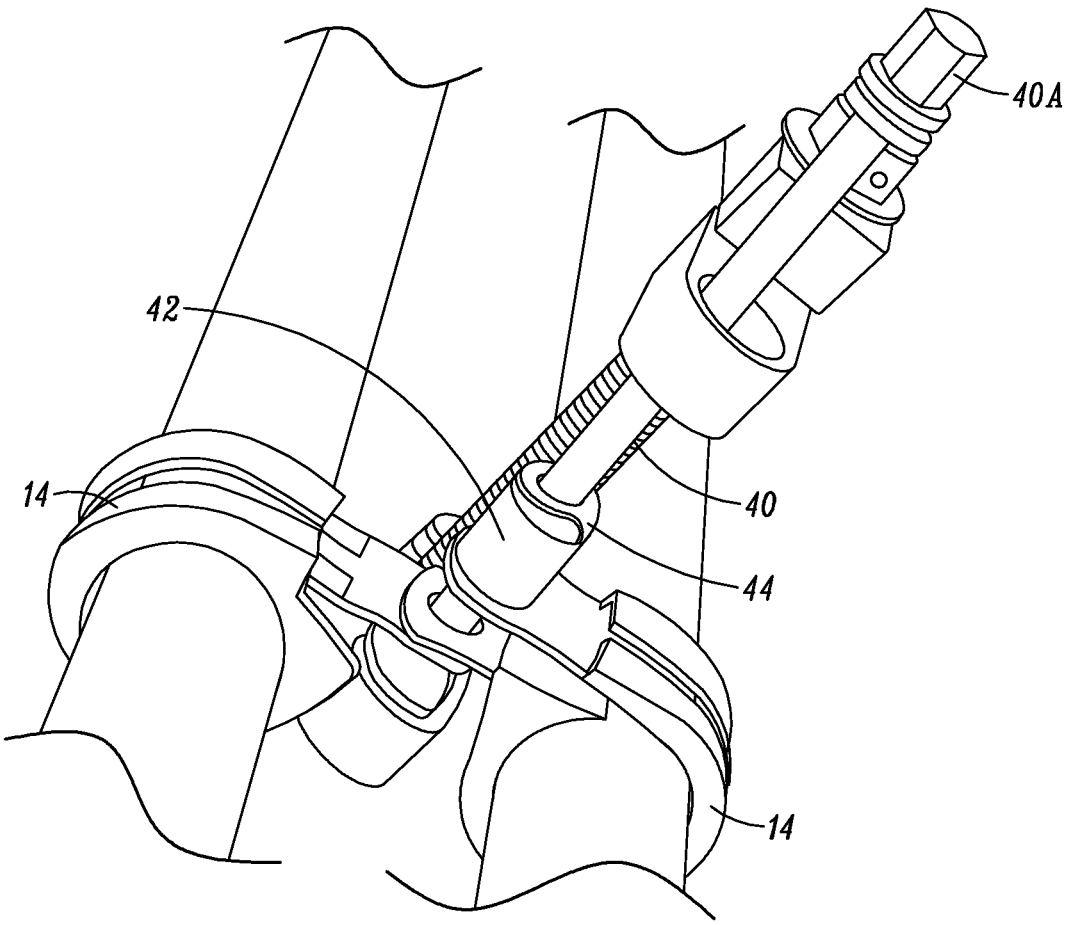

With reference to FIG. 16, after establishing a sufficient distance between the upper and lower jaws 30 and 32, the upper jaw is moved into position on the alignment pin 40, with the drive head 40A of the alignment pin passing through the hole 54 on the upper jaw. The nut 41 threaded onto the bottom end of the alignment pin, is inserted into the hex-shaped region of the hole 64 (see FIG. 5) of the lower jaw.

In an alternative embodiment comprising the upper jaw 151 of FIG. 22, the alignment pin 40 is inserted into the slotted opening 154 of the upper jaw 151.

The drive screw 36 is then rotated, by manual rotation using a tool mated with the upper end 81 (see FIG. 7), to move the upper jaw 30 toward the lower jaw 32. As the upper jaw closes toward the lower jaw, the proper position and alignment of the band clamps 10 must be maintained. This alignment is maintained primarily by the alignment pin passing through the upper jaw, the lower jaw, and the bolt holes of the loop-type band clamps.

As the distance between the upper and lower jaws decreases, the spring-like opening force exerted by the loop-type band clamps resists the force exerted to close the distance between the upper and lower jaws and thereby close the loop-type band clamps. This may require application of a counter torque to continue moving the upper and lower jaws together. This counter torque can be applied using a hand tool on any one of the upper retainer 34, the guide pin 38, the upper jaw 30, or the lower jaw 32.

FIG. 17 shows the upper and lower jaws 30 and 32 in a closed configuration capturing and closing the loop-type band clamps 10.

With the drive screw 36 applying sufficient force between the upper jaw and lower jaw to ensure the tool components and the band clamps do not slip from position, the alignment pin 40, the hold washer 44, and the bushing 42 are removed by application of a torque to the drive head 40A of the alignment pin 40, releasing the alignment pin from the alignment nut 41.

The resulting configuration is shown in FIG. 18. The loop-type band clamp bolt holes remain aligned responsive to the forces exerted on them by the upper jaw and the lower jaw. See also the bottom view of FIG. 19.

Figure 9:
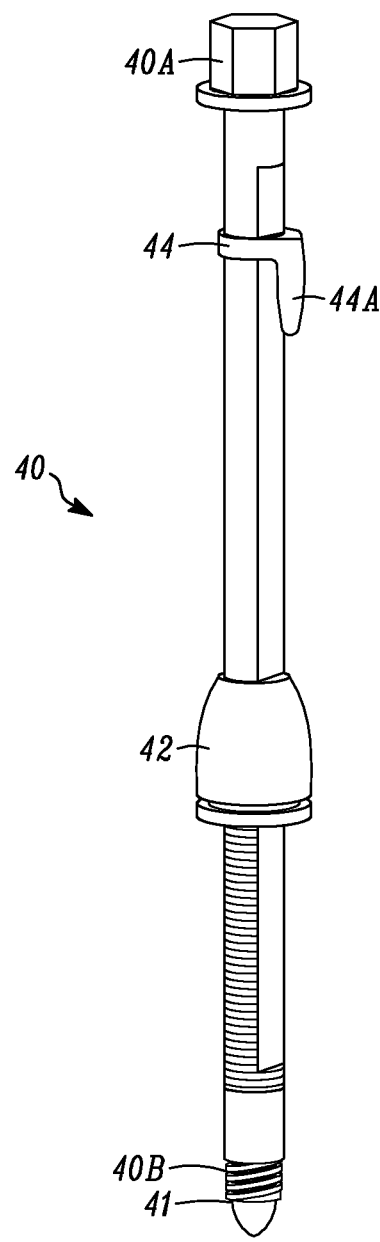
FIG. 9 illustrates an alignment pin of the installation tool of the present invention.
Figure 10:
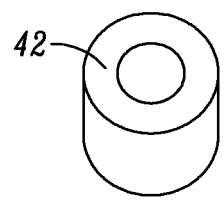
FIG. 10 illustrates a bushing of the installation tool of the present invention.

In one embodiment the hold washer and bushing are captured on the alignment pin, free floating between the drive head end 40A and the threaded end 40B (see FIG. 9). This configuration eliminates the possibility of losing the washer and bushing.

Figure 20:
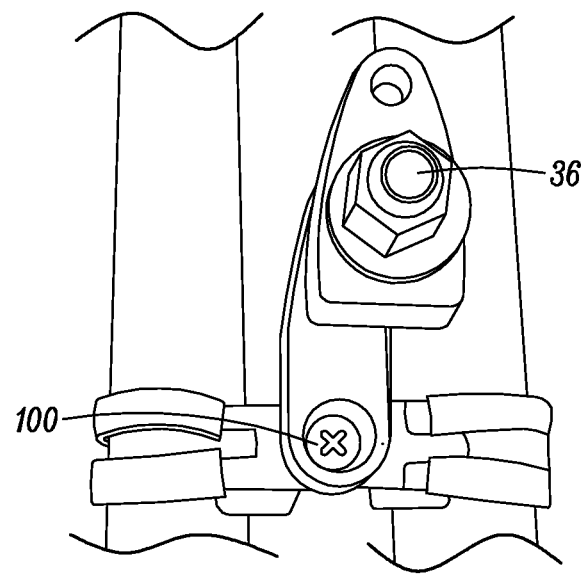
FIG. 20 illustrates the bottom view of FIG. 19 after installation of a bolt to secure the loop type band clamps together.
Figure 21:
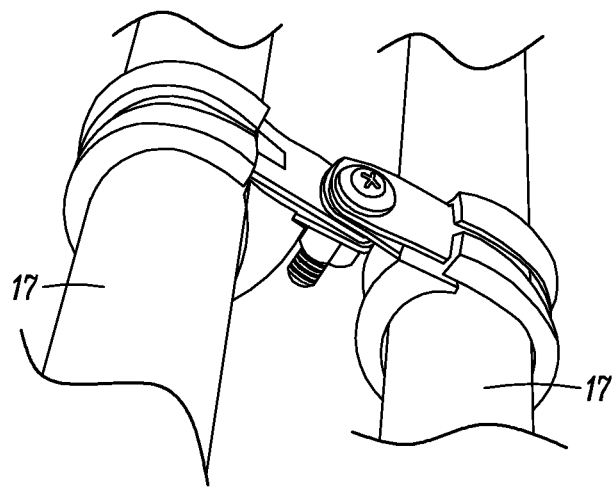
FIG. 21 illustrates the completed installation after removing the installation tool of the present invention and securing the loop-type band clamps together.

As shown in FIG. 20, a bolt or screw 100 is installed through the hole 54 in the upper jaw (see FIG. 4), through the bolt holes or tab openings in the tabs 16A and 16B of the loop-type band clamps 10 (see FIGS. 1A and 1B), and into the nut 41 (not visible) captured in the hex-shaped region of the hole 64 of the lower jaw 32.

The diameter of the hole 54 in the upper jaw is greater than the diameter of a head of the bolt 100, allowing the upper jaw 30 to be removed after the bolt 100 and mating nut are installed and the band clamps 10 are secured.

When this bolt or screw 100 has been mated with nut threads and the band clamps secured, the upper jaw 30 and the lower jaw 32 are loosened from the loop-type band clamps by reversing the drive screw 36. The installation tool of the invention is then removed and installation of the loop type band clamps is complete. See FIG. 21.

The loop-type band clamp installation tool 19 is of modular design and in other embodiments may be used without any one or all of the upper retainer 34, the guide pin 38, the bushing 42, and the hold washer 44, allowing the tool to be reduced in size for use in spaces that are difficult to access. The important tool components comprise the alignment pin, the upper jaw and the lower jaw, and a component for moving them together responsive to an applied force to compress the loop type band clamps.

It is also important to maintain the clamp bolt holes in alignment as the upper and lower jaws close or compress the loop-type band clamp around the object. In another embodiment, a bolt or a shortened pin can be used, especially if the alignment pin 40 is too long for the available work space.

In one embodiment described herein, the guide pin 38 and the upper retainer 34 add stability to the tool during use, provide a hand-tool gripping surface area for applying counter torque, and offer ease-of-use when using the tool for removing or replacing hardware in loop-type band clamps that have been secured together.

Figure 23:
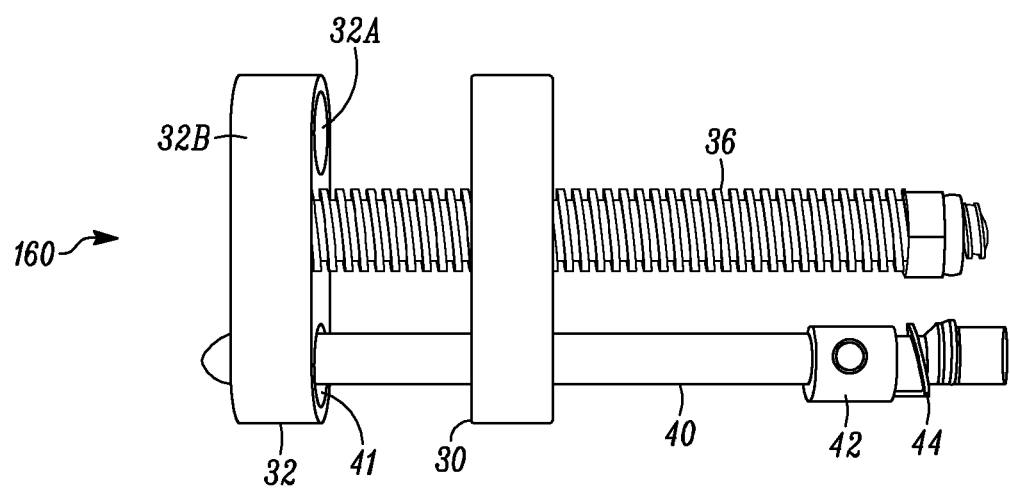
FIG. 23 illustrates an alternative embodiment of the installation tool.

But installation of loop-type clamps in spaces with restricted access may require that the tool be used without these elements and the advantages they provide so that the tool can be accommodated in the space available. See FIG. 23 illustrating an embodiment of the installation tool 160 absent the guide pin and the upper retainer.

This embodiment comprises fewer elements and may be physically smaller than the other described embodiments, at the expense of greater difficulty in using the tool and finally securing the loop type band clamps together or using the tool to release closed/installed loop type band clamps.

Yet another embodiment of the lower jaw incorporates a maximally sized, constant cross-section, through-hole in place of the hex hole described herein, i.e., element 64 of FIG. 5.

Many loop-type band clamps are currently installed with hardware (i.e., a bolt) that is longer than required due to the difficulties encountered when installing shorter, more appropriately sized bolts and screws.

Thus, technicians may use the tool without the alignment pin (and associated bushing and hold washer) to replace these longer bolts and screws with shorter, more appropriate lengths. In this embodiment the drive screw passes freely through the lower jaw, with the lower jaw captured between the button in the stepped hole and the retainer, clips, etc. in the groove above the lower jaw. The drive screw is threadably engaged with the upper jaw. The stepped hex hole 64 in the lower jaw is placed over the previously installed nut that holds the band clamps in place, and the upper and lower jaws are brought together by operation of the drive screw such that the loop type clamps are gripped tightly by the jaws. When this operation is complete, the screw head is centered in the upper jaw hole 54 and the nut is captured in lower jaw hole 64.

Then the longer-than-necessary bolt or screw is removed by turning the screw head and is replaced with a shorter bolt or screw. Note that this replacement has been accomplished without loosening and then refastening the loop type clamps, as the upper and lower jaws retain the clamp tabs in a compressed state during removal of the longer-than-necessary bolt and installation of more appropriately sized hardware.

Flowchart Describing Operation of the Loop-Type Band Clamp Installation Tool

Figure 24:
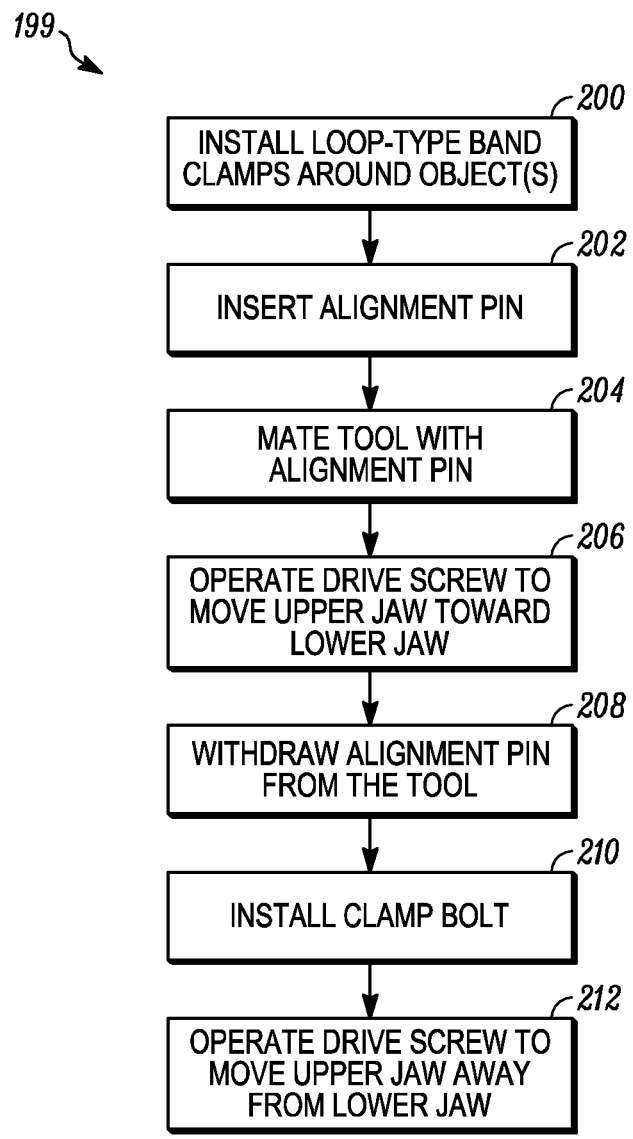
FIG. 24 illustrates a flow chart describing use of the installation tool.

FIG. 24 is a flowchart 199 illustrating use of the tool of the present invention.

At a step 200 a loop-type band clamp (or a plurality of loop-type band clamps) is installed around an object 17 by capturing the object (or each one of the plurality of loop-type band clamps captures an object) within the loop 14. See FIG. 1

At a step 202 the alignment pin 40 is inserted into the bolt holes 16A and 16B of the loop-type clamp 16. See FIGS. 1A and 1B. In particular the lower threaded end 40B of the alignment pin is inserted into the bolt holes 16A and 16B and receives an alignment pin nut 41 (see FIG. 13) for securing the alignment pin within the bolt holes.

At a step 204 the installation tool 19 including especially the upper jaw 30 and the lower jaw 32 are mated with the alignment pin 40. The installation tool 19 is mated with the alignment pin 40 as the lower jaw 32 receives the alignment pin nut 41 within its stepped opening 64 (see FIG. 5) and the upper jaw 30 receives the alignment pin within its opening 54 of FIG. 4 or the slotted opening 154 of FIG. 22.

At a step 206 the drive screw 36 is operated to bring the upper and lower jaws together, thereby compressing the tabs of the loop type band clamps therebetween.

Once compressed, at a step 208 the alignment pin is withdrawn by first threadably disengaging the threaded end 40B of the alignment pin from the nut 41 then withdrawing the alignment pin 40 from the opening 64 in the lower jaw. The alignment pin is then slid out from the hole 54 or the slotted opening 154 in the upper jaw 30. The nut 41 remains within the stepped opening 64 of the lower jaw.

At a step 210 the clamp bolt is inserted through the hole 54 of the upper jaw 30 or through the slotted opening 154 of the upper jaw. The hole/opening 54 or 154 is sized slightly larger than a diameter of the head of the clamp bolt. The clamp bolt then is threadably mated with the alignment pin nut 41 that had been retained within the stepped hole 64 of the lower jaw 32. The clamp bolt is tightened in the alignment pin nut to secure the loop-type band clamps together.

At a step 212 the drive screw 36 is operated to release the upper and lower jaws from the loop-type band clamp. The installation is now complete.

What is claimed is:

1. A tool for securing a loop of a loop-type band clamp around object captured within the loop, the tool comprising:
   an upper jaw
   a lower jaw oppositely disposed relative to the upper jaw;
   a drive screw rotatably disposed within a first opening of the lower jaw and threadably engaged with mating threads in a second opening in the upper jaw, such that as the drive screw rotates the upper jaw is displaced relative to the lower jaw;
   an alignment component for inserting through holes in tabs extending from the loop of the loop-type band clamp;
   a fastener for engaging a receiving end of the alignment component after the alignment component is disposed through the opposing holes in the tabs;
   a third opening defined in the lower jaw for receiving the fastener;
   a fourth opening defined in the upper jaw for receiving an upper segment the alignment component;
   the upper and lower jaws for compressing the tabs therebetween by operation of the drive screw and thereby closing the loop around the object;
   while the tabs remain in the compressed state, the alignment component separable from the fastener and the fastener remaining in the first opening of the lower jaw, the upper segment of the alignment component removable from the fourth opening in the upper jaw; and
   the upper and lower jaws removable from the loop-type band clamp by operation of the drive screw.

2. The installation tool of claim 1, the fourth opening defined in the upper jaw comprising a slotted opening.

3. The installation tool of claim 1 wherein the alignment component comprises an alignment pin, the fastener comprises a nut, and the receiving end comprises a threaded receiving end of the alignment pin, the nut for threadably engaging the threaded receiving end.

4. The installation tool of claim 3, the third opening in the lower jaw comprising a stepped opening for receiving the nut.

5. The installation tool of claim 1, the alignment component further comprising a drive end opposite the receiving end, the drive end shaped for receiving a tool to which a user applies a force for turning the alignment component relative to the fastener.

6. The installation tool of claim 1, further comprising a friction-based component disposed on the alignment component for exerting a compression force counteracting a spring force exerted by the tabs when the alignment component is disposed within the holes in the tabs.

7. The installation tool of claim 6, the friction-based component comprising a hold washer further comprising a tang extending from an outer circumferential surface of the hold washer, and a bushing defining an axial opening for receiving the alignment component therein, a surface of the bushing in contact with the washer tang such that the bushing is nearer the receiving end of the alignment component than the hold washer.

8. The installation tool of claim 1, the fastener comprising a nut, a bolt passing through the fourth opening in the upper jaw for threadably engaging the nut, the fourth opening having a diameter greater than a diameter of a bolt head.

9. The installation tool of claim 1, further comprising a guide pin slidably disposed within a fifth opening within the upper jaw and firmly secured within a sixth opening in the lower jaw.

10. An installation tool comprising:
an upper jaw defining first and second openings therein;
a lower jaw oppositely disposed relative to the upper jaw and defining third and fourth openings therein;
a drive screw rotatably disposed within the third opening of the lower jaw and threadably engaged with mating threads in the second opening in the upper jaw, such that as the drive screw rotates the upper jaw is displaced relative to the lower jaw; and
an alignment component comprising a first end passing through the fourth opening of the lower jaw and the alignment component further comprising a second end extending through the first opening of the upper jaw, the first end of the alignment component for mating with a fastener non-rotatably received within the fourth opening, a retainer disposed on the alignment component between the first and second ends.

11. The installation tool of claim 10 the drive screw comprising a drive end proximate the upper jaw, the drive end for receiving a force-applying tool for displacing the upper jaw relative to the lower jaw.

12. The installation tool of claim 10, further comprising a guide pin slidably disposed within a fifth opening defined in the upper jaw and firmly secured within a sixth opening defined in the lower jaw.

13. The installation tool of claim 10, the alignment component comprising an alignment pin, the first end of the alignment pin comprising a threaded end and the fastener comprising a nut for threadably engaging the threaded end, the fourth opening of the lower jaw comprising a stepped opening for non-rotatably receiving the nut.

14. The installation tool of claim 13, the second end of the alignment pin comprising a drive end shaped for use in applying torque to the alignment pin for threadably engaging the alignment pin with the nut.

15. The installation tool of claim 10, wherein the retainer comprises a friction-based retainer.

16. The installation tool of claim 15, the alignment component comprising an alignment pin, the friction-based retainer comprising a bushing defining an axial opening, a first surface, and an oppositely disposed second surface, the first surface in a direction toward the lower jaw, the friction-based retainer further comprising a hold washer, the alignment pin disposed within the axial opening, the hold washer disposed on the alignment pin in a direction toward the second surface, and the hold washer further comprising a tang extending from a circumferential surface of the hold washer, the tang for placing in contact with the second surface to resist a force exerted on the first surface.

17. A method for securing a loop of a loop-type band clamp around an object captured within the loop, tabs extending from each end of the loop, the method comprising:
inserting an alignment component through opposing holes in tabs extending from the loop of the loop-type band clamp;
engaging a fastener on a receiving end of the alignment component;
capturing the fastener in a lower jaw of an installation tool;
capturing a segment of the alignment component in an upper jaw of the installation tool;
the lower jaw oppositely disposed relative to the upper jaw;
rotating a drive screw mated with the upper and lower jaws to move the upper and lower jaws together and thereby exert a compressive force on the tabs;
the alignment component applying a force to retain the tabs in a compressed state after the upper and lower jaws have been removed from contact with the tabs;
removing the alignment component from the opposing holes in the tabs while the fastener remains captured within the lower jaw;
inserting a male component through an opening in the upper jaw and engaging the male component with the fastener, a diameter of the opening in the upper jaw greater than a diameter of the male component; and
after the male component and the fastener have been engaged, removing the upper and lower jaws from contact with the tabs.

18. The method of claim 17, a step of capturing a segment of the alignment component in the upper jaw comprises capturing the segment in a slotted opening defined in the upper jaw.

19. The method of claim 17, wherein the receiving end of the alignment component comprises a threaded end and the fastener comprises a nut, a step of engaging a fastener on the receiving end of the alignment component comprises threadably engaging the threaded end with the nut.

20. The method of claim 19, wherein a step of capturing the fastener in the lower jaw of the installation tool comprises receiving the nut in a stepped opening in the lower jaw.

* * * * *